July 28, 1942.　　P. DUMAINE ET AL　　2,291,455
METHOD OF MAKING BALANCE WHEELS
Filed Aug. 10, 1939
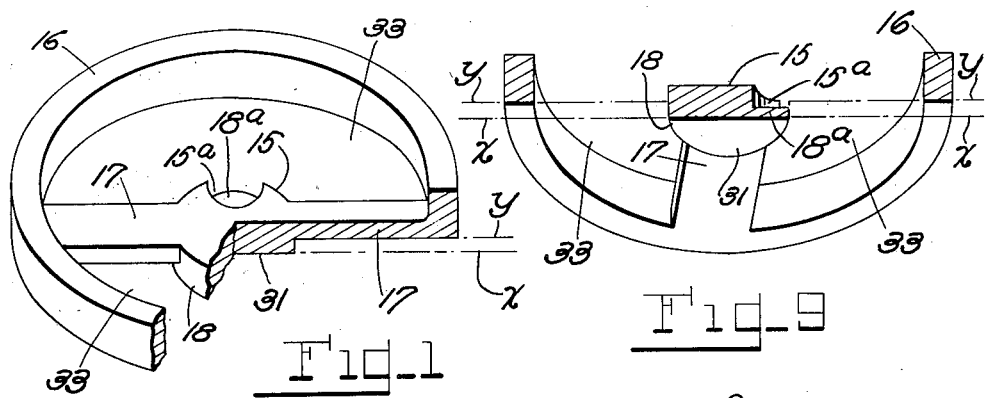
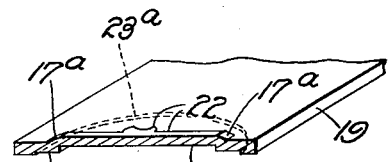
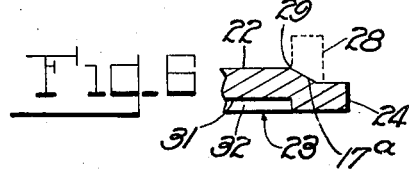
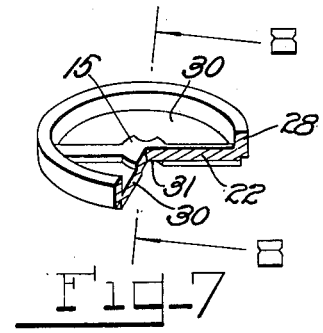
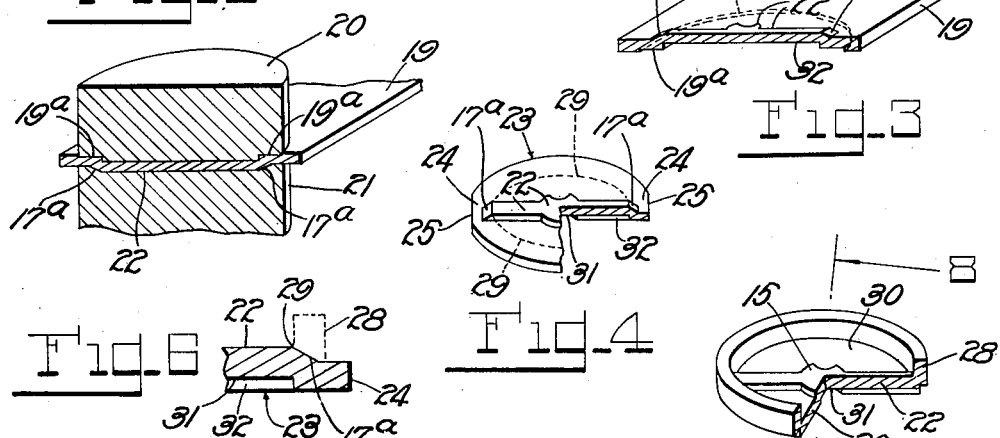
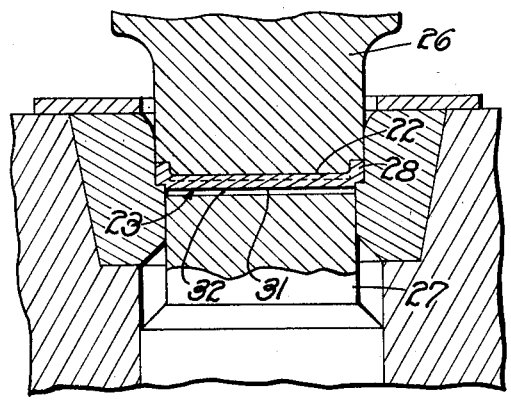
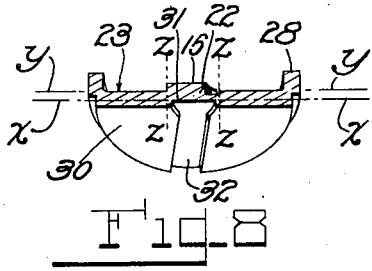
INVENTORS:
Pierre Dumaine
Arthur P. Emmert
by Dike, Calver & Gray
Attys.

Patented July 28, 1942

2,291,455

UNITED STATES PATENT OFFICE 2,291,455

METHOD OF MAKING BALANCE WHEELS

Pierre Dumaine, Waltham, Mass., and Arthur P. Emmert, Muncie, Ind., assignors to Waltham Watch Company, Waltham, Mass., a corporation of Massachusetts Application August 10, 1939, Serial No. 289,414

5 Claims. (Cl. 29—178)

This invention relates to the manufacture of wheels for watches and similar timepieces, and especially, although not exclusively, to the manufacture of balance wheels and their associated rollers, and has for its object to simplify the production of such parts without in any way impairing their accuracy but, on the contrary, insuring and enhancing the latter.

The manufacture, for example, of balance wheels for watch movements, as heretofore carried out, has involved a long succession of difficult, intricate and delicate punching, machining, grinding, truing, finishing, and other operations, requiring the highest skill in order to obtain the extreme accuracy required of such parts, and making their production correspondingly expensive. In accordance with the present invention, many of these hitherto necessary operations are eliminated and replaced by a relatively few simple operations which are, for the most part, self-controlling, thereby materially reducing the time, equipment and skill required for the production of such articles. Also, in accordance with the practice heretofore followed, the balance wheels and their associated rollers, which carry the jewel pins for cooperation with the escapement pallets, are separately formed and thereafter assembled, whereas in accordance with one form of the present invention the rollers may be, as an incident to the process, formed integral with the balance wheels, thereby further simplifying the operation and automatically insuring the accuracy of the assembly.

The invention will best be understood from the following description of the manufacture, in accordance therewith, of a balance wheel and its associated roller, as illustrated in the accompanying drawing, this description and illustration having, however, been chosen for purposes of exemplification merely, as it will be obvious to those skilled in the art that the invention, as defined by the claims hereunto appended, may be otherwise practiced for the production of the same or other similar articles without departure from the spirit and scope thereof.

In said drawing:

Fig. 1 is a perspective view, greatly enlarged and partly broken away, of a balance wheel produced in accordance with the invention.

Fig. 2 is a sectional perspective view illustrating an initial step in the process.

Fig. 3 is a sectional perspective view of the stock after the performance thereon of the operation illustrated in Fig. 2.

Fig. 4 is a perspective view, partly broken away, of said stock after said initial step and an associated blanking out operation.

Fig. 5 is a sectional view illustrating a succeeding step in the process.

Fig. 6 is a fragmentary sectional view showing more in detail the step illustrated in Fig. 5.

Fig. 7 is a perspective view, partly broken away, of the work in the condition following the operation illustrated in Figs. 5 and 6.

Fig. 8 is a sectional perspective view of the same work, indicating the final step of the process, the section being on the line 8—8, Fig. 7, and the work being turned to show the side opposite that shown in the latter figure.

Fig. 9 is a sectional perspective view illustrating said final step and the result thereof, the plane of section being the same as in Fig. 8.

Referring to Fig. 1, a balance wheel resulting from the method herein described may comprise a central hub 15 connected with a circumferential rim 16 by radial spokes 17, and an integral coaxial roller 18 constituting an extension of the hub 15 beyond the spokes 17, the hub having a depression 15a leaving a shelf, or portion of reduced thickness, 18a at the free side of the roller. As herein shown, there are two diametrically oppositely disposed spokes 17, although a greater number may be formed if desired. It will be understood that the rim 16 will be subsequently drilled and tapped to receive the usual balance screws, the hub 15 and roller 18 drilled and broached to receive the usual balance arbor, and the shelf 18a punched or drilled to receive the usual jewel pin, all in accordance with usual practices forming no part of the present invention.

In accordance with this invention, a strip 19 of suitable sheet metal stock, preferably beryllium copper, is subjected to a swaging action in suitable dies 20 and 21, as shown in Fig. 2, to displace, or offset laterally, central and radial portions 22 corresponding in outline to the hub 15 and spokes 17, with inclined or wedge shaped portions 17a at the ends of the latter, as shown in Fig. 3. Previously or subsequently to, or concurrently with, the aforesaid swaging or offsetting operation, the stock is punched to form a substantially circular blank or disk 23, Fig. 4, with respect to which the offset portion 22 is radially or diametrically disposed, the dies 20 and 21 being of such form as to compress or consolidate the stock 19, as shown at 19a, Figs. 2 and 3, within the area of the disk 23, the outline of which is indicated by the dotted line 23a in Fig. 3. The disk 23 is of somewhat greater diameter than the length of the offset portion 22 to leave a marginal portion 24 which, in order to facilitate a subsequent operation, is preferably slightly relieved or slabbed off opposite the ends of said offset portion as shown at 25.

The disk 23 may then be subjected to the action of a pair of bending or drawing and swaging dies 26 and 27, Fig. 5, which may act to displace or bend the marginal portion 24 at right angles in the direction of the displacement of the offset portion 22, as shown in Fig. 6, to form a circumferential flange 28, and to draw or swage said flange to accurate and uniform width and thickness. The bending proceeds, without a break, about a circumferential line 29, Figs. 4 and 6, which intersects the bases of the wedge shaped portions 17a, the material of the latter being caused to flow and compensate for the relieved portions 25. The die 26 is preferably of such shape as to form a small fillet at the ends of the offset portion 22 to reinforce the joint between said offset portion and the flange 28.

The portion 30 (Figs. 7 and 8) of the disk 23 still remaining in its original condition, that is to say, the material of the original disk not displaced by the offsetting of the portion 22 and the flange 28, may then be machined away by a turning operation, first across the entire face of the disk opposite the displaced portions to the plane indicated by the line $x$—$x$, Figs. 8 and 9, to bring said face substantially flush with or slightly beyond the bottom 31 (Figs. 6 and 8) of the cavity 32 (Figs. 3, 4, 6 and 8) formed at that side of the disk by offsetting the portion 22, and then to the plane indicated by the line $y$—$y$, Figs. 8 and 9, i. e., for the full thickness of the original blank, outside a region spaced from the center, as indicated by the lines $z$—$z$, $z$—$z$, Fig. 8, to the outer periphery, thereby removing all of the material of the portion 30 outside the region $z$—$z$, $z$—$z$ and leaving a central hub 15, a rim 16, and intermediate supporting spokes 17 with openings 33 (Figs. 1 and 9) between said hub and rim bridged by said spokes, the part of the material left within the region $z$—$z$, $z$—$z$ constituting an integral roller 18. The turning operations, particularly that between the planes $x$—$x$ and $y$—$y$, preferably proceed in the direction away from the center and toward the periphery to leave as much of the material 30 as possible adjacent the rim until it is completely cut away, thereby assisting the spokes in supporting the rim during the turning operation and preventing distortion of the parts.

It will be seen that, in accordance with the invention, the entire procedure necessary in order to produce the combined balance wheel and roller shown in Fig. 1 includes, in addition to the punching out of the blank 23, Fig. 4, only two simple swaging and drawing operations, illustrated in Figs. 2 and 5, and a turning operation, illustrated in Fig. 8. These take the place of some twelve or more delicate and intricate operations heretofore necessary in forming the balance wheel alone, as well as additional operations required to form and assemble the roller. Moreover, accuracy is insured without skill, at least up to the stage illustrated in Fig. 7, since the shape, size and position of all parts formed up to this point are entirely determined by the shape of the dies 20, 21, 26 and 27 which, after having once been accurately made, will produce absolutely uniform work without skilled attention on the part of the operator, while the turning operations illustrated in Fig. 8 can be easily controlled with a minimum of skill. If it is desired to form a balance wheel without an integral roller, instead of turning a double step operation, the entire material of the undisplaced portion 30 of the blank can be removed by turning down to the plane $y$—$y$ entirely across the face in a single operation.

We claim:

1. The method of making balance and similar wheels for time pieces which comprises laterally displacing central and radial portions of a one-piece flat metal disk while maintaining the remaining portions of the disk undisplaced, said radial portions extending from the central portion onto a margin portion at the periphery of the disk, bending the margin portion of the disk in the direction of such displacements to form a circumferential flange, cutting away the surface of the undisplaced portions of the disk on the face opposite said displaced portions to a depth equal to that of the recesses therein formed by said displaced portions, and then cutting away the remaining undisplaced portion of the disk surrounding said central portion from the face opposite said displaced portions through the face adjacent said displaced portions to leave a hub, a rim, supporting spokes and an integral coaxial roller with openings between said hub and rim bridged by said spokes.

2. The method of making balance and similar wheels for time pieces which comprises laterally displacing central and radial portions of a one-piece flat metal disk and forming wedge-shaped portions at the ends of said radial portions while maintaining the remaining portions of the disk undisplaced, said radial portions extending from the center onto a margin portion at the periphery of the disk, bending the margin portion of the disk in the direction of such displacements above a line intersecting the bases of said wedge-shaped portions to form a circumferential flange, cutting away the surface of the undisplaced portions of the disk on the face opposite said displaced portions to a depth equal to that of the recesses therein formed by said displaced portions, and then cutting away the remaining undisplaced portion of the disk surrounding said central portion from the face opposite said displaced portions through the face adjacent said displaced portions to leave a hub, a rim, supporting spokes and an integral coaxial roller with openings between said hub and rim bridged by said spokes.

3. The method of making a time-piece wheel which comprises laterally displacing in the same direction integral radial and annular portions from initially flat metal stock, said displacement being accompanied by a relative lateral shifting of the radial and annular portions and of the zone of integral relationship therebetween at least partially beyond the plane of the undisplaced portions in the displacement direction, and then removing all undisplaced material throughout its full thickness within said annular portion by progressive cutting action in and substantially parallel to the plane of said material, to leave integral radial and annular portions with openings therebetween formerly occupied by the undisplaced material.

4. The method of making a time-piece wheel which comprises laterally displacing in the same direction integral radial and annular portions from initially flat metal stock, said displacement being accompanied by a relative lateral shifting of the radial and annular portions and of the zone of integral relationship therebetween at least partially beyond the plane of the undisplaced portions in the displacement direction, and then machining away undisplaced material throughout its full thickness within said annular portion by rotational movement of said material relative to a cutting tool, the cutting action progressing in a radially outward direction substantially parallel to the plane of said material, to leave integral substantially undistorted radial and annular portions with openings therebetween formerly occupied by said undisplaced material.

5. The method of making a time-piece balance wheel with an integral coaxial roller comprising laterally displacing integral central, radial, and annular portions from initially flat metal stock, said displacement being accompanied by a lateral shifting of the zone of integral relationship between said radial and annular portions at least partially beyond the plane of the undisplaced portions in the displacement direction, removing material from that side of the undisplaced portions which is opposite the displaced portions, to a depth substantially equal to that of a recess formed by said displacement, by a progressive planar cutting operation, and then removing the remaining material from the undisplaced portions surrounding said central portion from the face opposite said displaced portions through the face adjacent said displaced portions to leave an annular portion, radially extending spokes integral therewith, and a coaxial roller integral with said spokes.

PIERRE DUMAINE.
ARTHUR P. EMMERT.